United States Patent
Wan et al.

(10) Patent No.: US 12,146,049 B2
(45) Date of Patent: Nov. 19, 2024

(54) STYRENE-ISOPRENE/BUTADIENE DIBLOCK COPOLYMER, HYDROGENATED BLOCK COPOLYMER, COMPOSITION FORMED THEREFROM, AND THE USE THEREOF

(71) Applicant: LCY CHEMICAL CORP., Kaohsiung (TW)

(72) Inventors: Yi-Cheng Wan, Kaohsiung (TW); Chen-Yu Wang, Kaohsiung (TW)

(73) Assignee: LCY CHEMICAL CORP., Kaohsiung (TW)

( * ) Notice: Subject to any disclaimer, the term of this patent is extended or adjusted under 35 U.S.C. 154(b) by 130 days.

(21) Appl. No.: 17/713,580

(22) Filed: Apr. 5, 2022

(65) Prior Publication Data

US 2022/0332937 A1    Oct. 20, 2022

Related U.S. Application Data

(60) Provisional application No. 63/175,192, filed on Apr. 15, 2021.

(30) Foreign Application Priority Data

Jan. 19, 2022  (CN) .......................... 202210063156.9

(51) Int. Cl.
| | |
|---|---|
| *C08L 53/00* | (2006.01) |
| *C08F 8/04* | (2006.01) |
| *C08F 212/08* | (2006.01) |
| *C08F 236/06* | (2006.01) |
| *C08F 236/08* | (2006.01) |

(52) U.S. Cl.
CPC ................ *C08L 53/00* (2013.01); *C08F 8/04* (2013.01); *C08F 212/08* (2013.01); *C08F 236/06* (2013.01); *C08F 236/08* (2013.01); *C08L 2203/202* (2013.01)

(58) Field of Classification Search
CPC .. C08F 297/046; C08F 236/06; C08F 236/08; C08F 212/08; C08F 8/04
See application file for complete search history.

(56) References Cited

U.S. PATENT DOCUMENTS

| | | | |
|---|---|---|---|
| 2005/0137312 A1* | 6/2005 | DuBois | C08L 53/025 525/88 |
| 2014/0147927 A1* | 5/2014 | Su | G01N 33/225 422/54 |
| 2015/0232884 A1* | 8/2015 | Duehring | C12N 9/88 435/167 |
| 2018/0223140 A1* | 8/2018 | Minamide | C09J 123/14 |
| 2021/0324130 A1* | 10/2021 | Kato | C08L 69/00 |

FOREIGN PATENT DOCUMENTS

| | | | |
|---|---|---|---|
| TW | 202003674 A | 1/2020 | |
| WO | WO-2019230527 A1 * | 12/2019 | ............ C08F 287/00 |

OTHER PUBLICATIONS

Office Action of corresponding Application No. 111112813 T issued on Sep. 8, 2023, 6 pages.

* cited by examiner

*Primary Examiner* — Mark S Kaucher

(74) *Attorney, Agent, or Firm* — MUNCY, GEISSLER, OLDS & LOWE, PC

(57) ABSTRACT

A styrene-isoprene/butadiene diblock copolymer contains a polystyrene block and a polyisoprene/butadiene block. Based on 100 wt % of the styrene-isoprene/butadiene diblock copolymer, the polystyrene block is 20-45 wt %, and the polyisoprene/butadiene block is 55-80 wt %. The polyisoprene/butadiene block has a polyisoprene unit and a polybutadiene unit. The weight ratio of the polyisoprene unit to the polybutadiene unit is 8:2 to 2:8.

9 Claims, No Drawings

STYRENE-ISOPRENE/BUTADIENE DIBLOCK COPOLYMER, HYDROGENATED BLOCK COPOLYMER, COMPOSITION FORMED THEREFROM, AND THE USE THEREOF

CROSS REFERENCE TO RELATED APPLICATIONS

This application claims priority of U.S. Provisional Application No. 63/175,192, filed on Apr. 15, 2021, and China Patent Application No. 202210063156.9, filed on Jan. 19, 2022, the entirety of which is incorporated by reference herein.

BACKGROUND DISCLOSURE

Field of the Disclosure

The present disclosure relates to a styrene-isoprene/butadiene diblock copolymer, a hydrogenated block copolymer, a filling composition containing the hydrogenated block copolymer, and the use of the filling composition in protecting fiber optic cables.

Description of the Related Art

With the rapid development of optical communications (mobile phones, computers, televisions, networks, etc.), the demand for fiber optic cables is increasing day by day. Optical communication transmits information via fiber optic cables, wherein the core material of the fiber optic cables is optic fibers. However, during the manufacture, installation, and use of a fiber optic cable, the optic fiber can be corroded under the effect of stress, and can be corroded in high temperature environment; thereby the information transmission performance of the fiber optic cable will be reduced. Therefore, fiber optic filling gel needs to be used to protect optic fibers from damage.

Generally, a filling composition for a fiber optic filling gel of the fiber optic cable contains about 85 to 91 parts by weight of mineral oil, 9 to 15 parts by weight of styrene-ethylene/propylene (SEP) diblock copolymer. The SEP diblock copolymer has a polystyrene content of 35% to 40%, and the filling composition optionally further contains a viscosity modifier, a rheology modifier, or an antioxidant.

The SEP diblock copolymer is used as the major component of the fiber optic filling composition, and has thixotropic characteristics, high-temperature performance, and the ability of cushion. However, existing fiber filling compositions are not satisfactory in all respects. Therefore, changing the filling composition or finding alternative components to improve the properties mentioned above has become the development focuses for various manufacturers.

BRIEF SUMMARY

In accordance with some embodiments of the present disclosure, a styrene-isoprene/butadiene diblock copolymer is provided, containing: a polystyrene block; and a polyisoprene/butadiene block; wherein based on 100 wt % of the styrene-isoprene/butadiene diblock copolymer, the polystyrene block is 20-45 wt %, and the polyisoprene/butadiene block is 55-80 wt %; wherein the polyisoprene/butadiene block has a polyisoprene unit and a polybutadiene unit, and the weight ratio of the polyisoprene unit to the polybutadiene unit is 8:2 to 2:8.

In accordance with some embodiments of the present disclosure, a hydrogenated block copolymer is provided, containing: a polystyrene block; and a hydrogenated polyisoprene/butadiene block, wherein based on 100 wt % of the hydrogenated block copolymer, the polystyrene block is 20-45 wt %, and the hydrogenated polyisoprene/butadiene block is 55-80 wt %, wherein the hydrogenated polyisoprene/butadiene block has a hydrogenated polybutadiene unit and a hydrogenated polyisoprene unit, and the weight ratio of the hydrogenated polybutadiene unit to the hydrogenated polyisoprene unit is 8:2 to 2:8.

In accordance with some embodiments of the present disclosure, a composition is provided, containing the hydrogenated block copolymer mentioned above.

In accordance with some embodiments of the present disclosure, a use of the composition mentioned above is provided, as a filling composition of a fiber optic cable.

In accordance with some embodiments of the present disclosure, a method of manufacturing a hydrogenated block copolymer is provided, wherein the hydrogenated block copolymer contains a polystyrene block and a hydrogenated polyisoprene/butadiene block, the method contains the following step: performing a first polymerization reaction with isoprene and butadiene in the presence of an initiator, and performing a second polymerization reaction with styrene to form a styrene-isoprene/butadiene diblock copolymer; and performing a hydrogenation of the styrene-isoprene/butadiene diblock copolymer to form a hydrogenated block copolymer.

In order to make the features of this disclosure obvious and easy to understand, the following examples are specially cited, combined with the accompanying drawings, and detailed descriptions are as follows. For other precautions, please refer to the technical field.

BRIEF DESCRIPTION OF THE DRAWINGS

None.

DETAILED DESCRIPTION

The followings describe a styrene-isoprene/butadiene diblock copolymer, a hydrogenated block copolymer, and a composition thereof provided in the disclosure in detail. It should be understood that the following description provides many different embodiments or examples for implementing different aspects of some embodiments of the present disclosure. Specific elements and arrangements are described below to simplify and clarify some embodiments of the present disclosure. These are, of course, merely examples and are not intended to be limiting.

The term "about", "approximately" as used herein indicates the value of a given quantity that varies within 5% of the value, preferably 3% of the value, much preferably 2%, 1%, or 0.5% of the value. It is noted that, the quantity provided in the specification is an approximate quantity, that is, if there is no specific description of "about", "approximately" and "substantially", "about", "approximately" and "substantially" can still be implied.

In this specification, "-" is used to separate different blocks, and "/" is used to refer to units derived from different monomers in the same block.

"Styrene-isoprene/butadiene diblock copolymer" refers to a diblock copolymer containing a polystyrene block (A) and a polyisoprene/butadiene block (B). The polyisoprene, butadiene block (B) (also referred as I/B block in the present disclosure) refers to a block formed by the copolymerization of isoprene monomer and butadiene monomer in a manner of tapered, random, etc, but not limited thereto. "Styrene-isoprene/butadiene diblock copolymer" is also referred as SIB (styrene-isoprene/butadiene) block copolymer or S-I/B block copolymer in the present disclosure.

"Hydrogenated block copolymer" refers to a block copolymer containing a polystyrene block (A) and a hydrogenated polyisoprene/butadiene block (C). The hydrogenated polyisoprene/butadiene block (C) is formed after hydrogenation step of the polyisoprene/butadiene block (B) in the styrene-isoprene/butadiene diblock copolymer. Specifically, the polyisoprene/butadiene block (B) has a polyisoprene unit (B1) and a polybutadiene unit (B2). The polyisoprene unit (B1) will form a hydrogenated polyisoprene unit (C1) after hydrogenation, and the polybutadiene unit (B2) will form a hydrogenated polybutadiene unit (C2) after hydrogenation.

"Styrene" refers to a compound (or monomer) with a structure

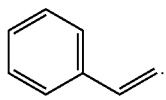

"Polystyrene block" refers to a block formed by polymerization of styrene monomer, and with a unit of structure

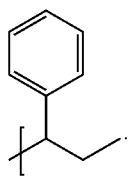

"Isoprene" refers to a compound (or monomer) with a structure

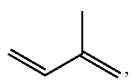

also referred as 2-methyl-1,3-butadiene.

"Butadiene" refers to a compound (or monomer) with a structure

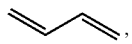

also referred as 1,3-butadiene.

"Polyisoprene/butadiene block" refers to a block formed by polymerization of isoprene monomer and butadiene monomer. The resulting unit structure varies depending on where the isoprene monomer is polymerized. Specifically, when isoprene performs a 1,4 addition reaction, a double bond remains in the main chain of the polymer (shown as cis and trans isomers of formula (a) and formula (b) below). When the isoprene performs a 1,2 addition reaction and a 3,4 addition reaction, the vinyl group is attached to the main chain, that is, the vinyl group is located in the branch chain (the result of the 1,2 addition reaction is shown as formula (c) below, and the result of the 3,4 addition reaction is shown as formula (d) below). More specifically, a polyisoprene unit (B1) is a unit derived from isoprene monomer after polymerization reaction, and contains the structures of the following formula (a), formula (b), formula (c), formula (d), or a combination thereof.

formula (a)

formula (b)

formula (c)

formula (d)

Likewise, the resulting unit structure varies depending on where the butadiene monomer is polymerized. Specifically, when butadiene performs a 1,4 addition reaction, double bonds remain in the main chain of the polymer (shown as cis and trans isomers of formula (e) and formula (f) below). When butadiene performs a 1,2 addition reaction, the vinyl group is attached to the main chain, that is, the vinyl group is located in the branch chain (shown as formula (g) below). More specifically, the polybutadiene unit (B2) is a unit derived from butadiene monomer after polymerization reaction, and contains the structures of the following formula (e), formula (f), formula (g), or a combination thereof.

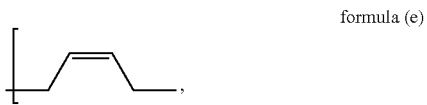

formula (e)

formula (f)

formula (g)

It should be noted that the content of double bonds remaining in the main chain of the polymer or attached to the main chain (ie, vinyl groups) will affect the properties of the polymer in the present disclosure. It will be described in detail below and will not be repeated here.

"Hydrogenated polybutadiene unit (C2)" refers to a unit derived from a polybutadiene unit (B2) after hydrogenation reaction, and contains the structures of the following formula (h), formula (i), or a combination thereof.

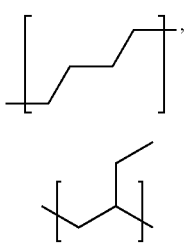

formula (h)

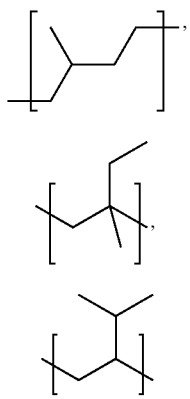

formula (i)

"Hydrogenated polyisoprene unit (C1)" refers to a unit derived from a polyisoprene unit (B1) after hydrogenation reaction, and contains the structures of the following formula (j), formula (k), formula (l), or a combination thereof.

formula (j)

formula (k)

formula (l)

"Vinyl" refers to a double bond functional group attached to the main chain of the polymer, such as the structures of formula (c), formula (d) in a polyisoprene unit, and formula (g) in a polybutadiene unit.

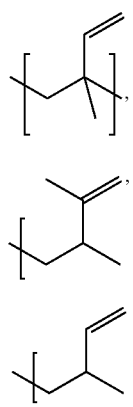

formula (c)

formula (d)

formula (g)

"Ether" refers to an organic compound with an ether functional group, and the ether functional group mentioned above refers to an oxygen atom formed by connecting two alkyl groups or aromatic groups.

"Amine" refers to an organic compound formed by the substitution of hydrogen in an ammonia molecule ($NH_3$) by a hydrocarbyl group.

In this specification, the polystyrene content, vinyl content, and hydrogenation rate in the block copolymer are the amounts determined by nuclear magnetic resonance spectrum analysis (NMR).

The present disclosure discloses a novel styrene-isoprene/butadiene (SIB) diblock copolymer and a novel hydrogenated block copolymer formed by hydrogenating the SIB diblock copolymer. The hydrogenated block copolymer can replace a SEP diblock copolymer in the filling composition. It has good thixotropic characteristics, good high-temperature performance, and good ability of cushion, which will be evaluate by shear viscosity, dropping point, and cone penetration. The measurement methods will be described in detail below.

The dropping point in the present disclosure refers to the temperature at which the first drop of the fill composition falls from the test cup from a semi-solid state to a liquid state under specified test conditions.

The cone penetration in the present disclosure refers to the depth to which a standard cone penetrates the sample under fixed conditions.

The shear viscosity in the present disclosure refers to the viscosity measured at shear rates of $6\ s^{-1}$, $50\ s^{-1}$ and $200\ s^{-1}$ at a temperature of 25±0.5° C.

A styrene-isoprene/butadiene diblock copolymer, a hydrogenated block copolymer, a composition thereof, and a manufacturing method thereof of the present disclosure will be described in detail below.

[Styrene-Isoprene/Butadiene Diblock Copolymer]

The embodiment of the present disclosure provides a styrene-isoprene/butadiene diblock copolymer, containing: a polystyrene block (A) and a polyisoprene/butadiene block (B). In some embodiments, based on 100 wt % of the styrene-isoprene/butadiene diblock copolymer, the polystyrene block (A) is 20-45 wt %, the polyisoprene/butadiene block (B) is 55-80 wt %. More preferably, the polystyrene block (A) is 30-40 wt %, and the polyisoprene/butadiene block (B) is 60-70 wt %.

In accordance with the inventor's research, the polyisoprene/butadiene block (B) is softer than the polystyrene block (A), and is a high elastic block with greater free rotational ability. The polystyrene block (A) is harder and can aggregate into a strong plastic phase. In some embodiments, if the polystyrene block (A) is greater than 45 wt %, the styrene-isoprene/butadiene diblock copolymer may become too hard or have poor compatibility with oils because the content of the hard block is too high. It leads to the composition formed from its hydrogenated polymer being easily brittle or oil bleeding after being subjected to external force, thereby weakening the protection of the optic fibers. If the polystyrene block (A) is less than 20%, it may cause the styrene-isoprene/butadiene diblock copolymer to become too soft, such that the composition formed from its hydrogenated polymer has a lower shear viscosity and a higher cone penetration, i.e., poor thixotropic characteristics and ability of cushion.

The polyisoprene/butadiene block (B) mentioned above has a polyisoprene unit (B1) and a polybutadiene unit (B2). In some embodiments, the weight ratio (B1:B2) of the polyisoprene unit (B1) to the polybutadiene unit (B2) is 8:2 to 2:8.

In some embodiments, the vinyl content of the polyisoprene/butadiene block (B) is 0.1-40 mol %, preferably 3-20 mol %, more preferably 5-15 mol %. In some embodiments, the vinyl content of the polyisoprene unit (B1) is 0.1-40 mol % of the polyisoprene unit (B1), preferably 3-20 mol %, more preferably 5 mol %-15 mol %. In some embodiments, the vinyl content of the polybutadiene unit (B2) is 0.1-40 mol % of the polybutadiene unit (B2), preferably 3-20 mol %, more preferably 5-15 mol %.

"Vinyl content of polyisoprene unit (B1)" refers to mol % of isoprene monomer derived to form the structures of formula (c) and formula (d), corresponding to all isoprene monomers forming the polyisoprene unit (B1). "Vinyl content of polybutadiene unit (B2)" refers to mol % of butadiene monomer derived to form the structure of formula (g), corresponding to all isoprene monomers forming the polybutadiene unit (B2). "Vinyl content of the polyisoprene/butadiene block (B)" refers to mol % of butadiene monomer and isoprene monomer derived to form the structures of formula (c), formula (d), and formula (g), corresponding to all isoprene monomers and butadiene monomers forming the polyisoprene/butadiene block (B).

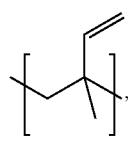

formula (c)

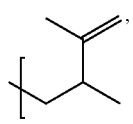

formula (d)

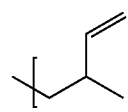

formula (g)

As previously mentioned, the amount of double bonds remaining in the main chain of the polymer or attached to the main chain (i.e., vinyl) will affect the properties of the polymer in the present disclosure. Specifically, In accordance with the inventor's research, the polyisoprene unit (B1) has the structures of formula (c) and formula (d), the polybutadiene unit (B2) has the structure of formula (g), and these structures have branched vinyl groups. Due to the high content of the branched vinyl groups, the intermolecular interaction between copolymer molecules decreases; such that the copolymer becomes softer. It leads to the composition formed by its hydrogenated polymer having lower dropping point and shear viscosity and higher cone penetration, i.e., poor high-temperature performance, thixotropic characteristics and ability of cushion, thereby weakening the protection of the optic fibers.

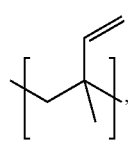

formula (c)

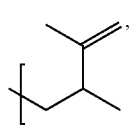

formula (d)

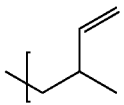

formula (g)

It is worth mentioning that relative to the polymer of the same molecular weight, polymers with lower vinyl content have increased intermolecular force, providing better thixotropic characteristics, high-temperature performance, and ability of cushion (details will be described below). The same performance requirements can be achieved under the condition of reducing the amount of polymer in the composition, thus saving costs; or under the same amount of the polymer in the composition, the same performance requirements can be achieved under the condition of lower polymer molecular weight due to the reduction of the vinyl content, and there is also the advantage of reducing the cost of raw materials. For example, the composition can achieve good optic fiber protection when the used polymer is hydrogenated from a lower molecular weight (eg, weight average molecular weight (Mw) in the range of 110,000-250,000) of styrene-isoprene/butadiene diblock copolymer by controlling the vinyl content of the polyisoprene unit (B1) to 5-15 mol % and the vinyl content of the polybutadiene unit (B2) to 5-15 mol %.

In some embodiments, the weight average molecular weight (Mw) of the styrene-isoprene/butadiene diblock copolymer is 100,000-360,000, preferably 105,000-330,000, more preferably 110,000-250,000. In accordance with the inventor's research, if the molecular weight is less than 100,000, the copolymer may not be used as a composition of fiber optic gel, because the molecular weight of the copolymer is too low and the molecular weight of the polystyrene block in the copolymer decreases. It leads to the intermolecular force of the hydrogenated block copolymer become lower, such that the composition formed therefrom has a lower dropping point and a higher cone penetration, that is, a worse high-temperature performance and ability of cushion. If the molecular weight is greater than 360,000, the intermolecular force of the copolymer is too strong, because the molecular weight of the copolymer is too high and the molecular weight of the polystyrene block increases. It leads to the shear viscosity being too high and poorer processing ability. The composition formed therefrom has other problems such as failure to fill the loose tube for optic fiber or easily generating air bubbles, which results weaker protection of the optic fiber.

[Hydrogenated Block Copolymer]

An embodiment of the present disclosure provides a hydrogenated block copolymer, containing a polystyrene block (A) and a hydrogenated polyisoprene/butadiene block (C). The hydrogenated block copolymer mentioned above is hydrogenated from the aforementioned styrene-isoprene/butadiene diblock copolymer. The polyisoprene unit (B1) in the styrene-isoprene/butadiene diblock copolymer contains the following structures of formula (a), formula (b), formula (c), formula (d), or a combination thereof. The polybutadiene unit (B2) contains the following structures of formula (e), formula (f), formula (g), or a combination thereof.

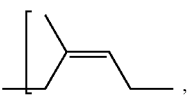

formula (a)

formula (b)
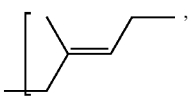

formula (c)
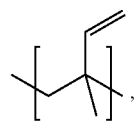

formula (d)
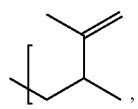

formula (e)
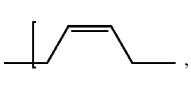

formula (f)
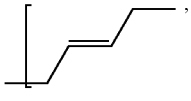

formula (g)
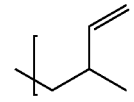

The polyisoprene unit (B1) forms the hydrogenated polyisoprene unit (C1) after hydrogenation. The hydrogenated polyisoprene unit (C1) contains the following structures of formula (j), formula (k), formula (l), or a combination thereof.

formula (j)
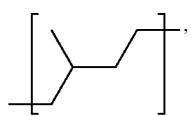

formula (k)
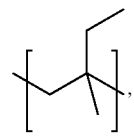

formula (l)
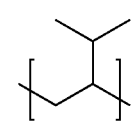

The polybutadiene unit (B2) forms the hydrogenated polybutadiene unit (C2) after hydrogenation. The hydrogenated polybutadiene unit (C2) contains the following structures of formula (h), formula (i), or a combination thereof.

formula (h)
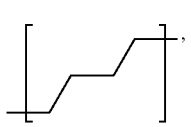

formula (i)
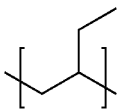

In some embodiments, based on 100 w %1 of the hydrogenated block copolymer, the polystyrene block (A) is 20-45 wt/o, and the hydrogenated polyisoprene/butadiene block (C) is 55-80 wt %. More preferably, the polystyrene block (A) is 30-40 wt % and the hydrogenated polyisoprene/butadiene block (C) is 60-70 wt %.

In accordance with the inventor's research: the hydrogenated polyisoprene/butadiene block (C) in the hydrogenated block copolymer and the polyisoprene, butadiene block (B) in the styrene-isoprene/butadiene diblock copolymer are all soft blocks. The styrene block (A) is a hard block, such that the content range and the effect of the polystyrene block (A) in the hydrogenated block copolymer is the same as the polystyrene block (A) in the styrene-isoprene/butadiene diblock copolymer.

The hydrogenated polyisoprene/butadiene block (C) mentioned above has a hydrogenated polyisoprene unit (C1) and a hydrogenated polybutadiene unit (C2). In some embodiments, the weight ratio (C1:C2) of the hydrogenated polyisoprene unit (C1) to the hydrogenated polybutadiene unit (C2) is 8:2 to 2:8.

The hydrogenation process mentioned above can improve the heat resistance, weather resistance, and color stability of the polymer, such that the polymer is not easy to crack. Moreover, the hydrogenation process can also improve the compatibility of the polymer with oil and the physical properties of the composition, which is beneficial to the subsequent formation of the composition. In some embodiments, the hydrogenation rate of the hydrogenated polyisoprene/butadiene block (C) in the hydrogenated block copolymer is greater than or equal to 96%, preferably greater than or equal to 98%.

In some embodiments, the weight average molecular weight (Mw) of the hydrogenated block copolymer is 100,000-360,000, preferably 105,000-330,000, more preferably 110,000-250,000. The advantages of the weight average molecular weight within the above range are as mentioned above, and will not be repeated here.

In addition to good thixotropic characteristics, the composition formed by the hydrogenated block copolymer mentioned above also has good high-temperature performance and good ability of cushion. Details will be described below.

[Process for Manufacturing Hydrogenated Block Copolymer]

In some embodiments, the method of forming a hydrogenated block copolymer contains: adding isoprene, butadiene, an initiator, and a microstructure modifier in a solvent to perform a first polymerization reaction. After the reaction is completed, a polyisoprene/butadiene block (B) is formed. In some embodiments, the reaction mentioned above can be performed at a temperature of 45-65° C.

Next, styrene is added to the solution containing the polyisoprene/butadiene block (B) to perform a second polymerization reaction to form the polystyrene block (A) in an end of the polyisoprene/butadiene block (B). After the styrene is completely polymerized, a styrene-isoprene/butadiene diblock copolymer is formed.

Next, hydrogenation of the styrene-isoprene/butadiene diblock copolymer is performed to selectively hydrogenate the polyisoprene/butadiene block to form a hydrogenated block copolymer. In some embodiments, the hydrogenation reaction mentioned above can be performed by adding a hydrogenation catalyst and adding hydrogen at 60-70° C. After the reaction is completed, it is washed with a solution of acid and with water to extract the hydrogenation catalyst. A hydrogenated block copolymer can be obtained.

In other embodiments, the method of forming a hydrogenated block copolymer contains: adding styrene, a microstructure modifier, and an initiator to perform a first polymerization reaction in a solvent. After the reaction is completed, a polystyrene block (A) is formed.

Next, isoprene and butadiene are added to the solution containing the polystyrene block (A) to perform a second polymerization reaction to form the polyisoprene/butadiene block (B) in an end of the polystyrene block (A). After the polymerization is completed, a styrene-isoprene/butadiene diblock copolymer is formed.

Next, hydrogenation of the styrene-isoprene/butadiene diblock copolymer is performed to selectively hydrogenate the polyisoprene/butadiene block to form a hydrogenated block copolymer.

The microstructure modifiers and the initiator mentioned above can be added at a time adjusted as required respectively. For example, in some embodiments, the microstructure modifiers and the initiators can be added during the polymerization reaction of forming the polyisoprene/butadiene block (B). In other embodiments, the microstructure modifiers and the initiators may be added during the polymerization reaction of forming the polystyrene block (A).

In some embodiments, the solvent for the polymerization reaction mentioned above can be any suitable solvent that does not deactivate the polymerization reaction. For example, the solvent may be saturated hydrocarbons, aromatic hydrocarbons, etc., or a combination thereof. Specifically, the solvent may be aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, xylene, etc., and hydrocarbons containing mixtures thereof, but not limited thereto.

In some embodiments, the initiator can be anything that can catalyze the polymerization reaction to form the polymer. In some embodiments, the initiator mentioned above may be, for example, an organolithium compound. Specifically, the organolithium compound may be mono-organolithium compounds such as n-butyllithium, sec-butyllithium, tert-butyllithium, n-propyllithium, iso-propyllithium and benzyllithium, etc.; polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene and 1,3,5-trilithio-2,4,6-triethylbenzene, etc., or a combination thereof, but not limited thereto. Preferably, the initiator is a mono-organolithium compound of n-butyllithium, sec-butyllithium, and tert-butyllithium.

The microstructure modifier mentioned above is a vinylating agent that controls the microstructure of the conjugated diene moiety, and can improve the polymerization speed. Therefore, an appropriate amount of the polar compound can be added as a microstructure modifier depending on the required vinyl content. The polar compound contains ether, diether, amine, or a combination thereof.

The polar compound mentioned above can be, for example, tetrahydrofuran, dimethyl ether, diethyl ether, alkane, ethylene glycol dimethyl ether, ethylene glycol dibutyl ether, diethylene glycol dimethyl ether, diethylene glycol dibutyl ether, dimethoxybenzene, 2,2-bis(2-oxolanyl) propane, etc.; tertiary amine compounds such as tetramethylethylenediamine, dipiperidinoethane, trimethylamine, trimethylamine, tripropylamine, tributylamine, pyridine, and quinuclidine, etc.; alkaline metal alkoxide compounds such as potassium-t-amylate, potassium-t-butyrate, sodium-t-butyrate and sodium amylate, etc.; and phosphine compounds such as triphenyl phosphine, etc., but not limited thereto. The polar compounds listed above may be used alone or in combination of two or more.

The hydrogenation step mentioned above can selectively hydrogenate the polyisoprene/butadiene block (B) in the styrene-isoprene/butadiene diblock copolymer, and can be any suitable selective hydrogenation method. The hydrogenation catalyst may contains a Group VIII B metal compound with a metal such as nickel or cobalt which is combined with a metal compound with a metal selected from Groups I-A, II-A, and III-A of the Periodic Table, such as lithium, magnesium or aluminum, but not limited to. Specifically, the group VIII B metal compound contained in the hydrogenation catalyst is, for example, nickel octanoate, nickel ethylhexanoate, nickel acetylacetonate, cobalt octanoat, nickel caprate, nickel-onkieselguhr, nickel carboxylate, nickel acetyl acetonate, nickel ethoxide, nickel butoxide, cobalt ethyl hexanoate, cobalt decanoate, cobalt neodecanoate, cobalt carboxylate, cobalt ethoxide, cobalt butoxide, cobalt acetyl acetonate, etc. The metal compound of Group IA, II-A or III-A mentioned above is, for example, lithium aluminum hydride, sodium borohydride, potassium borohydride, phenylmagnesium bromide, calcium hydride, trimethylaluminum, triethylaluminum, triisopropylaluminum, and trioctylaluminum, but not limited to.

[Composition]

The embodiment of the present disclosure provides a composition containing the hydrogenated block copolymer mentioned above. In some embodiments, the composition may contain 5-20 wt % of the hydrogenated block copolymer mentioned above and 80-95 wt % of oil. Preferably, the composition contains 5-15 wt % of the hydrogenated block copolymer mentioned above and 85-95 wt % of oil. More preferably, the composition contains 5-10 wt % of the hydrogenated block copolymer mentioned above and 90-95 wt % of oil.

In some embodiments, the oil may be, for example, paraffinic oil, mineral oil, base oil, silicone oil, synthetic oil, or a combination thereof, but not limited to. The oil is preferably base oil or synthetic oil, more preferably synthetic oil, which can stabilize the properties of the fiber optic filling gel of the embodiments of the present disclosure and is not easy to be oxidized or corroded.

The paraffinic oil mentioned above contains oil-enriched in paraffin. In some embodiments, the paraffinic oil is characterized by the presence of hydrocarbons having 12-50 carbon atoms, including a paraffin having an average number of carbon atoms that is less than or equal to about 20 (e.g., 16), or including a paraffin having an average carbon number of 16-30. In some aspects, the paraffinic oil suitable for use in the present disclosure may be a mixture of oils.

The mineral oil mentioned above is highly refined, colorless and odorless petroleum oil. Mineral oil (also referred as liquid petrolatum) is a by-product in the distillation of petroleum to produce gasoline. Mineral oil is chemically inert oils consisting mainly of linear, branched and cyclic alkanes (paraffins) of various molecular weights. Non-limiting examples of commercially available mineral oils include YUBASE 6 and PRIMOL 352.

The base oil mentioned above is selected from alkanes (containing straight chain, branched chain, multibranched alkanes), cycloalkanes (containing monocyclic, dicyclic, polycyclic cycloalkanes), aromatic hydrocarbons (containing monocyclic aromatic hydrocarbons, polycyclic aromatic hydrocarbons), cycloalkylaromatic hydrocarbon, polyalkylcyclopentane, fluorosilicone oil or fluoroether oil, but not limited thereto.

The synthetic oil mentioned above refers to those oils that include non-naturally occurring components derived through chemical processes, such as high molecular poly-alphaolefin oil.

In practical application, thixotropic characteristics, high temperature resistance, and the ability of cushion can be evaluated by shear rate viscosity, dropping point, and cone penetration. In some embodiments, when the composition of the present disclosure contains 5-20 wt % of hydrogenated block copolymer (e.g., 8 wt %), at least one of the following properties is met:

(1) A low shear rate viscosity of the composition of the embodiment of the present disclosure at 25° C. and at the shear rate of 6 $s^{-1}$ is 10,000-60,000 cP, preferably 15,000-55,000 cP, such as 45,000 cP, more preferably 19,000-52,000 cP, such as 30,000 cP.

(2) A middle shear rate viscosity of the composition of the embodiment of the present disclosure at 25° C. and at the shear rate of 50 $s^{-1}$ is 7,000-20,000 cP, preferably 8,000-19,500 cP, such as 18,000 cP, more preferably 9,000-19,000 cP, such as 16,000 cP.

(3) A high shear rate viscosity of the compositions of the embodiment of the present disclosure at 25° C. and at the shear rate of 200 $s^{-1}$ is 1,000-7,000 cP, preferably 2,000-6,500 cP, more preferably 2,500-6,000 cP.

(4) The composition of the embodiment of the present disclosure has a dropping point of 180-220° C. preferably 185-215° C., more preferably 190-210° C., and most preferably 200-210° C.

(5) The composition of the embodiment of the present disclosure has a cone penetration of 400-480 dmm, preferably 400-465 dmm, more preferably 410-460 dmm, and most preferably 420-450 dmm.

The composition of the present disclosure can be used as a filling composition of fiber optic gel for fiber optic cables, and the main characteristics are good thixotropic characteristics, high temperature resistance, and ability of cushion. The optic fibers of the fiber optic cable can be in an unstressed state in the loose tube under a high-temperature environment. Specifically, when the fiber optic gel is stressed in a high-temperature environment (such as carrying of optical cable, lifting, etc. of fiber optic cables), it can demonstrate a solid-like state to fix the optic fiber. When the stress is higher than a critical value (such as by bending, violent impact, etc.), the filling gel flows and the viscosity drops rapidly. Therefore, the optic fiber can release the stress almost at the same time when receiving stress without bending. In addition, because the thermodynamic phase of the filling gel tends to be solid-state, the filling gel gradually returns to high viscosity and the optic fiber is fixed after the optic fiber is freed. In contrast, when the ordinary fiber optic gel is stressed in a high temperature environment, the optic fiber receives stress at the same time, such that the optic fiber is in a partially stressed state for a long time, resulting in macrobending and microbending losses.

In some embodiments, the composition may further comprise 0.1-1 wt % of antioxidant as needed. The aforementioned antioxidants are high temperature antioxidants, and antioxidants and other stabilizing ingredients may be added to protect the composition from degradation caused by heat, light, and during handling or storage. Antioxidants such as the following can be used: hindered phenols, phosphite derivatives, or a combination thereof, but not limited to. Examples of suitable antioxidants include sterically hindered phenolic antioxidants (such as IRGANOX 1010), liquid phenolic antioxidants (such as IRGANOX L135), all available from BASF. Other examples include antioxidants IRGANOX 1076 and IRGANOX 1035 (both available from BASF).

In addition, in some embodiments, the composition may further comprise: 1-15 wt % of oil bleeding inhibitor, 1-20 wt % of organic thickening agent, 1-20 wt % of inorganic thickening agent, 1-2 wt % of organic flame retardant, 1-20 wt % of inorganic flame retardant, 0.05-0.5 wt % of metal deactivator, 1-20 wt % of rheology modifier, 0.1-1 wt % of hydrogen absorbing material, or a combination thereof. The oil bleeding inhibitor, organic thickening agent, inorganic thickening agent, organic flame retardant, inorganic flame retardant, metal deactivator, rheology modifier, and hydrogen absorbing material mentioned above can be known type to those skilled in the art.

In the following, the present disclosure will provide several examples to explain more specifically the effects that the styrene-isoprene/butadiene diblock copolymer, the hydrogenated block copolymer, and the composition can achieved according to the embodiments of the present disclosure, and the properties of the composition prepared by applying the present disclosure. However, the following examples are for illustrative purposes only, and should not be interpreted as limitations on the implementation of the disclosure.

[Preparation Example 1] Hydrogenated Block Copolymer

In the first step of preparation, isoprene and butadiene were anionic polymerized in cyclohexane to form a polyisoprene/butadiene (I/B) block. Specifically, 600 g of cyclohexane, a microstructure modifier, 0.8 mL of n-butyllithium as an initiator, 43 g of isoprene, and 29 g of butadiene were added to a 1.6 L reactor at a temperature of 45 to 65° C. for polymerization. After the reaction was completed, the I/B block was formed.

In the second step of preparation, a polystyrene (S) block was formed from styrene at an end of the I/B block. That is, a S-I/B block copolymer was formed. Specifically, after the I/B block was formed, 43 g of styrene was added to the reactor. Until the styrene was substantially completely polymerized, the S-I/B block copolymer was formed. Then, the reaction of the block copolymer was terminated by methanol.

In the third step of preparation, the selectively hydrogenated block copolymer was formed by selective hydrogenation. The copolymer was hydrogenated by using a standard Ni/Al technique. Specifically, after the S-I/B block copolymer was formed, a hydrogenation catalyst was added to the reactor, and hydrogen was purged into the reactor at 60-70° C. The hydrogenated block copolymer was formed when the hydrogenation reaction was finished. Then, the hydrogenation catalyst was extracted by washing the solution with an aqueous solution of acid and with water.

[Preparation Examples 2-5] Hydrogenated Block Copolymer

Cyclohexane, n-butyllithium, isoprene, butadiene, and styrene were added in accordance with the amounts shown in Table 1 respectively. The rest of the preparation methods were the same as the Preparation Example 1. The styrene-isoprene/butadiene diblock copolymers used in the experiments were obtained.

[Comparative Preparation Example 1] SEP Diblock Copolymer

Cyclohexane, n-butyllithium, isoprene, and styrene were added in accordance with the amounts shown in Table 1 respectively, and butadiene was not added. The rest of the preparation methods were the same as the Preparation Example 1. The SEP diblock copolymer used in the experiment was obtained.

[Example 1] Composition

The filling composition of the present disclosure was prepared by the following method. The hydrogenated block copolymer of the Preparation Example 1 mentioned above was added in a mixer and mixed with base oil 150N (Formosa) at 120 to 150° C. under vacuum until a homogeneous liquid was formed to prevent deterioration due to high temperature during preparation and to remove any entrained air bubbles. The hydrogenated block copolymer content was 8 wt %. The base oil 150N (Formosa) was highly refined, colorless, odorless petroleum oil with kinematic viscosity of 31.7 cSt at 40° C.

[Example 2-5] Composition

Except that the hydrogenated block copolymers used in the Examples 2-5 were the hydrogenated block copolymers of the Preparation Examples 2-5 respectively, the rest were the same as the Example 1. The compositions used in the experiment were obtained.

[Comparative Example 1] Composition

Except that the copolymer used in the Comparative Example 1 was the SEP diblock copolymer of the Comparative Preparation Example 1, the rest was the same as the Example 1. The composition used in the experiment was obtained.

The weight average molecular weight (Mw) of the present disclosure can be measured by gel permeation chromatography (GPC). The molecular weights in Table 1 and Table 2 were measured by using commercially available polystyrene calibration standards for calibration. GPC is a well-known method, wherein polymers are separated according to molecular size, with the largest molecule eluting first. The weight-average molecular weights of the styrene-isoprene/butadiene diblock copolymers and the hydrogenated block copolymers were measured by gel chromatography (GPC method) under the following conditions.
Device: Waters e2695 Separations Module
System software: Empower
Detector: RI
Solvent: THF (tetrahydrofuran)
Flow rate 1.0 mL/min
Column temperature: 40° C.
Injection volume: 100 μL
Under the following conditions, the vinyl content (vinyl %) and the styrene content of the styrene-isoprene/butadiene diblock copolymer before hydrogenation, and the hydrogenation rate of the hydrogenated block copolymer after hydrogenation were measured by the nuclear magnetic resonance spectrum analysis (NMR).
The measurement conditions of H-NMR were as follows.
Measuring instrument: VARIAN
Solvent: deuterated chloroform
Measurement sample: product removed from the polymer before and after hydrogenation
Sample concentration: 10 mg/mL
Observation frequency: 400 MHz
Measurement temperature: 25° C.
The components, the weight ratio (I/B ratio) of isoprene to butadiene added, the vinyl content of the polyisoprene unit (B1), and the vinyl content of the polybutadiene unit (B2), the content of the polystyrene block (A), and molecular weight of each Preparation Examples mentioned above are shown in Table 1. The content of the polystyrene block (A), the weight ratio (C1/C2 ratio) of the polyisoprene unit (C1) to the hydrogenated polybutadiene unit (C2), the hydrogenation rate, and molecular weight of hydrogenated block copolymer of each Preparation Examples mentioned above after hydrogenation reaction are shown in Table 2. The selected types of each component are described below.

TABLE 1

| SIB block copolymer/SI block copolymer | | Preparation Example 1 | Preparation Example 2 | Preparation Example 3 | Preparation Example 4 | Preparation Example 5 | Comparative Preparation Example 1 |
|---|---|---|---|---|---|---|---|
| First step | Cyclohexane | 600 g | 600 g | 600 g | 3600 g | 700 kg | 600 g |
|  | n-butyllithium | 0.8 mL | 0.5 mL | 0.6 mL | 1.7 mL | 779 mL | 1.1 mL |
|  | Isoprene | 43 g | 42 g | 52 g | 54 g | 39 g | 67 g |
|  | Butadiene | 29 g | 28 g | 13 g | 214 g | 25 kg | 0 |
| Second step | Styrene | 43 g | 31 g | 35 g | 132 g | 37 kg | 40 g |
|  | I/B ratio | 6/4 | 6/4 | 8/2 | 2/8 | 6/4 | 10/0 |
| Vinyl content in polyisoprene unit (B1) (mol %) | | 10.5 | 10.1 | 6.9 | 39.0 | 10.3 | 8.2 |
| Vinyl content in polybutadiene unit (B2) (mol %) | | 13.6 | 12.9 | 11.1 | 30.9 | 13.5 | — |
| Content of polystyrene block (A) (wt %) | | 37.9 | 30.5 | 34.3 | 33.5 | 37.2 | 37.8 |
| Molecular weight (k) | | 148.1 | 203.2 | 176.8 | 329.1 | 164.9 | 149.8 |

TABLE 2

| Hydrogenated block copolymer/SEP diblock copolymer | Preparation Example 1 | Preparation Example 2 | Preparation Example 3 | Preparation Example 4 | Preparation Example 5 | Comparative Preparation Example 1 |
|---|---|---|---|---|---|---|
| C1/C2 ratio | 6/4 | 6/4 | 8/2 | 2/8 | 6/4 | 10/0 |
| Hydrogenation rate(%) | 99.6 | 98.7 | 99.0 | 98.2 | 99.9 | 99.4 |
| Molecular weight (k) | 148.1 | 203.2 | 176.8 | 329.1 | 164.9 | 149.8 |

In Tables 1 and 2, each component represents the following compounds:
Cyclohexane: commercial source
n-butyllithium: commercial source
isoprene: commercial source
Butadiene: commercial source
Styrene: commercial source
SIB block copolymer: the styrene-isoprene/butadiene diblock copolymers of Preparation Examples 1-5
SI block copolymer: the styrene-isoprene diblock copolymer of the Comparative Preparation Example 1
Hydrogenated block copolymer: the hydrogenated block copolymers of the Preparation Examples 1-5
SEP diblock copolymer: the styrene-ethylene/propylene diblock copolymer of the Comparative Example 1

Next, various properties of the compositions of Examples 1-5 and Comparative Example 1 were measured by the following test methods and were reported in Table 3, respectively.

[Dropping Point Test]

The dropping point was measured in accordance with ASTM D566, which was entitled "Standard Test Method for Dropping Point of Lubricating Grease". A sample of the filling composition generally contained in a cup was suspended in a test tube and heated in an oil bath at a prescribed rate to a temperature in the range of 150-250° C. The temperature at which the sample falls from the hole in the bottom of the cup was averaged with the temperature of the oil bath and recorded as the dropping point of the filling composition.

[Shear Viscosity Test]

The shear viscosity was tested at temperatures of 25±0.5° C. with a water bath control using a Brookfield DV2THBCP viscometer with spindle CPA52Z. In the present disclosure, the low shear viscosity, middle shear viscosity, and high shear viscosity were measured at shear rates of 6 $s^{-1}$ (3 rpm), 50 $s^{-1}$ (25 rpm), and 200 $s^{-1}$ (100 rpm), respectively.

[Cone Penetration Test]

The cone penetration was measured in accordance with ASTM D937, which is entitled "Standard Test Method for Cone penetration of Petrolatum". The depth that 150 g of standard cone penetrated the sample at 5 seconds at a temperatures of 25±0.5° C. was measured by a penetrometer, and was in tenths of a millimeter (dmm).

It can be seen from Table 1, Table 2 and Table 3, the Preparation Examples 1-3 had lower vinyl content compared with the Preparation Example 4, which can make the hydrogenated block copolymers of Preparation Example 1-3 provide the compositions formed therefrom with good thixotropic characteristics, high-temperature performance, and ability of cushion at lower molecular weights compared with Preparation Example 4.

It can be seen from Table 1, Table 2 and Table 3, the Preparation Example 5 could still provide the composition formed therefrom with good thixotropic characteristics, high-temperature performance, and ability of cushion even when the amount of reactants was scaled up.

It can be seen from the Examples 1-5 of Table 1 and Table 2, by hydrogenating the styrene-isoprene/butadiene diblock copolymer to form a hydrogenated block copolymer, the Example of the present disclosure make the composition formed therefrom had the same good shear viscosity, dropping point, and cone penetration as the composition formed from the styrene-ethylene/propylene diblock copolymer of the Comparative Example, that is, it had good thixotropic characteristics, high-temperature performance, and ability of cushion, and can replace the traditionally used styrene-ethylene/propylene diblock copolymer of the Comparative Example.

Specifically, the low shear rate viscosity of the Examples 1-5 at a shear rate of 6 $s^{-1}$ were in the range of 15,000-55,000 cP, greater than 13,230 cP of the Comparative Example, and had better protection of the optic fiber. The middle shear rate viscosity of Examples 1-5 at a shear rate of 50 $s^{-1}$ were in the range of 7,000-20,000 cP, greater than 4,382 cP of the Comparative Example. The high shear rate viscosity of Examples 1-5 and the comparative example at a shear rate of 200 $s^{-1}$ were all in the range of 1,000-7,000 Cp. Therefore, the Examples 1-5 had good thixotropic characteristics. When it was used for the filling composition of fiber optic gel, it could provide good protection of the optic fiber by deformation when the fiber optic cable was under stress.

Moreover, the dropping point of the Examples 2-5 was in the range of 200-210° C., greater than 192° C. of the Comparative Example. Therefore, the Examples 2-5 had better high-temperature performance, and could still provide good protection of optic fiber at high temperature when it was used in the filling composition of fiber optic gel.

TABLE 3

| Physical properties of the composition | | Example 1 | Example 2 | Example 3 | Example 4 | Example 5 | Comparative Example 1 |
|---|---|---|---|---|---|---|---|
| Dropping point (° C.) | | 190 | 201 | 201 | 208 | 203 | 192 |
| Shear Viscosity (cP) | 6 $s^{-1}$ | 29110 | 51860 | 17460 | 50010 | 19580 | 13230 |
| | 50 $s^{-1}$ | 10760 | 17370 | 11210 | 18830 | 9589 | 4382 |
| | 200 $s^{-1}$ | 5485 | 4564 | 5937 | 2699 | 5945 | 4008 |
| Cone penetration (dmm) | | 437 | 433 | 461 | 424 | 442 | 484 |

Furthermore, the cone penetration of Examples 1-5 was in the range of 400-465 dmm, less than 484 dmm of the Comparative Example. Therefore, compared with the traditionally used styrene-ethylene/propylene diblock copolymer of the Comparative Example, the hydrogenated block copolymers of Examples 1-5 had better ability of cushion, and could also achieve the same ability of cushion as the Comparative Example under the condition of reducing the amount of polymer in the composition, thereby reducing the cost.

In summary, by hydrogenating the styrene-isoprene/butadiene diblock copolymer to form the hydrogenated block copolymer, the composition formed from the hydrogenated block copolymer can have good thixotropic characteristics, high-temperature performance, and ability of cushion.

The foregoing outlines features of several embodiments such that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A composition, comprising a hydrogenated block copolymer comprising:
    a polystyrene block; and
    a hydrogenated polyisoprene/butadiene block,
    wherein based on 100 wt % of the hydrogenated block copolymer, the polystyrene block is 20-45 wt %, and the hydrogenated polyisoprene/butadiene block is 55-80 wt %,
    wherein the hydrogenated polyisoprene/butadiene block has a hydrogenated polybutadiene unit and a hydrogenated polyisoprene unit, and a weight ratio of the hydrogenated polybutadiene unit to the hydrogenated polyisoprene unit is: 8:2 to 2:8,
    wherein the composition has a low shear rate viscosity of 10,000-60,000 cP at 25° C. and at a shear rate of 6 s$^{-1}$.

2. The composition as claimed in claim 1, wherein the hydrogenated block copolymer is 5-20 wt % of the composition.

3. The composition as claimed in claim 2, wherein the composition has a middle shear rate viscosity of 7,000-20,000 cP at 25° C. and at a shear rate of 50 s$^{-1}$.

4. The composition as claimed in claim 2, wherein the composition has a high shear rate viscosity of 1,000-7,000 cP at 25° C. and at a shear rate of 200 s$^{-1}$.

5. The composition as claimed in claim 2, wherein a dropping point of the composition is 180-220° C.

6. The composition as claimed in claim 2, wherein a cone penetration of the composition is 400-480 dmm.

7. The composition as claimed in claim 1, wherein the composition is used as a filling composition for fiber optic cable.

8. A composition, comprising a hydrogenated block copolymer comprising:
    a polystyrene block; and
    a hydrogenated polyisoprene/butadiene block,
    wherein based on 100 wt % of the hydrogenated block copolymer, the polystyrene block is 20-45 wt %, and the hydrogenated polyisoprene/butadiene block is 55-80 wt %,
    wherein the hydrogenated polyisoprene/butadiene block has a hydrogenated polybutadiene unit and a hydrogenated polyisoprene unit, and a weight ratio of the hydrogenated polybutadiene unit to the hydrogenated polyisoprene unit is: 8:2 to 2:8,
    wherein a dropping point of the composition is 180-220° C.

9. A composition, comprising a hydrogenated block copolymer comprising:
    a polystyrene block; and
    a hydrogenated polyisoprene/butadiene block,
    wherein based on 100 wt % of the hydrogenated block copolymer, the polystyrene block is 20-45 wt %, and the hydrogenated polyisoprene/butadiene block is 55-80 wt %,
    wherein the hydrogenated polyisoprene/butadiene block has a hydrogenated polybutadiene unit and a hydrogenated polyisoprene unit, and a weight ratio of the hydrogenated polybutadiene unit to the hydrogenated polyisoprene unit is: 8:2 to 2:8,
    wherein a cone penetration of the composition is 400-480 dmm.

* * * * *